US012263734B2

(12) United States Patent
Kozono et al.

(10) Patent No.: US 12,263,734 B2
(45) Date of Patent: Apr. 1, 2025

(54) VEHICLE INPUT DEVICE, VEHICLE INPUT METHOD, AND NON-TRANSITORY STORAGE MEDIUM STORED WITH VEHICLE INPUT PROGRAM

(71) Applicant: TOYOTA JIDOSHA KABUSHIKI KAISHA, Aichi-ken (JP)

(72) Inventors: Yuki Kozono, Toyota (JP); Shu Nakajima, Toyota (JP); Takeshi Nawata, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/354,642

(22) Filed: Jul. 19, 2023

(65) Prior Publication Data

US 2023/0356595 A1 Nov. 9, 2023

Related U.S. Application Data

(63) Continuation of application No. 17/073,399, filed on Oct. 19, 2020, now Pat. No. 11,787,289.

(30) Foreign Application Priority Data

Nov. 8, 2019 (JP) ................. 2019-203457

(51) Int. Cl.
*B60K 35/00* (2024.01)
*B60K 35/10* (2024.01)
(Continued)

(52) U.S. Cl.
CPC .............. *B60K 35/00* (2013.01); *B60K 35/10* (2024.01); *B60K 35/23* (2024.01); *B60K 35/29* (2024.01);
(Continued)

(58) Field of Classification Search
CPC .. B60K 37/06; B60K 35/00; B60K 2370/145; B60K 2370/143; B60K 2370/1446;
(Continued)

(56) References Cited

U.S. PATENT DOCUMENTS 10,029,723 B2 7/2018 Kim et al.
2002/0196233 A1 12/2002 Kataoka et al.
(Continued)

FOREIGN PATENT DOCUMENTS

DE 4410985 A1 10/1995
DE 10220797 A1 12/2003
(Continued)

OTHER PUBLICATIONS

Notice of Allowance in U.S. Appl. No. 17/073,399, mailed May 11, 2023, 18pp.
(Continued)

*Primary Examiner* — Christopher E Leiby
(74) *Attorney, Agent, or Firm* — HAUPTMAN HAM, LLP

(57) ABSTRACT

A vehicle input device comprises an operation detection section configured to detect input to an onboard unit allocated to one operation section of plural of operation sections provided in a vicinity of a driving seat due to the one operation section being operated, a preliminary action detection section configured to detect a preliminary action directly prior to the one operation section being operated, and a notification section configured to notify an occupant of information relating to the onboard unit allocated to the one operation section in a case in which the preliminary action has been detected by the preliminary action detection section.

20 Claims, 13 Drawing Sheets

(51) Int. Cl.
*B60K 35/23* (2024.01)
*B60K 35/29* (2024.01)
*B60K 35/60* (2024.01)

(52) U.S. Cl.
CPC ......... *B60K 35/60* (2024.01); *B60K 2360/115* (2024.01); *B60K 2360/139* (2024.01); *B60K 2360/143* (2024.01); *B60K 2360/145* (2024.01); *B60K 2360/197* (2024.01); *B60K 2360/782* (2024.01)

(58) Field of Classification Search
CPC ........ B60K 2370/152; B60K 2370/128; B60K 2370/139; B60K 2370/161; B60K 2370/141; B60K 2370/1529; B60K 2370/197; B60K 2370/115; B60K 2370/164; B60K 2370/782; B60K 2370/12; B60K 2370/199
See application file for complete search history.

(56) References Cited

U.S. PATENT DOCUMENTS

| | | | |
|---|---|---|---|
| 2004/0101608 A1* | 5/2004 | Lassota | A47J 31/525 426/489 |
| 2005/0021190 A1* | 1/2005 | Worrell | B60K 35/00 701/1 |
| 2006/0259210 A1 | 11/2006 | Tanaka et al. | |
| 2009/0164062 A1 | 6/2009 | Aoki et al. | |
| 2013/0166146 A1 | 6/2013 | Tanaka | |
| 2014/0181749 A1 | 6/2014 | Takikawa | |
| 2014/0239739 A1 | 8/2014 | Shibata | |
| 2015/0291032 A1 | 10/2015 | Kim et al. | |
| 2015/0344059 A1* | 12/2015 | Kim | B60Q 1/1484 345/184 |
| 2018/0081614 A1 | 3/2018 | Tsai et al. | |
| 2018/0178649 A1 | 6/2018 | Mimura et al. | |
| 2018/0329623 A1* | 11/2018 | Usami | B60K 35/10 |
| 2019/0187467 A1 | 6/2019 | Fujita | |
| 2020/0339174 A1 | 10/2020 | Sakamaki | |
| 2021/0081089 A1* | 3/2021 | Ihrig | G06F 3/0482 |

FOREIGN PATENT DOCUMENTS

| | | |
|---|---|---|
| JP | H10-214543 A | 8/1998 |
| JP | 2004-325237 A | 11/2004 |
| JP | 2006-315562 A | 11/2006 |
| JP | 2007-106353 A | 4/2007 |
| JP | 2007-164695 A | 6/2007 |
| JP | 2007-290562 A | 11/2007 |
| JP | 2007-296889 A | 11/2007 |
| JP | 2008-068673 A | 3/2008 |
| JP | 2010-201947 A | 9/2010 |
| JP | 2013-006472 A | 1/2013 |
| JP | 2013-121805 A | 6/2013 |
| JP | 2014-043232 A | 3/2014 |
| JP | 2014-123207 A | 7/2014 |
| JP | 2014-167868 A | 9/2014 |
| JP | 2018-077832 A | 5/2018 |
| JP | 2019-123312 A | 7/2019 |
| KR | 10-2018-0126419 A | 11/2018 |
| WO | 2018/051734 A1 | 3/2018 |

OTHER PUBLICATIONS

Office Action in U.S. Appl. No. 17/073,399, mailed Jan. 17, 2023, 25pp.

Office Action in U.S. Appl. No. 17/073,399, mailed Oct. 11, 2022, 37pp.

* cited by examiner

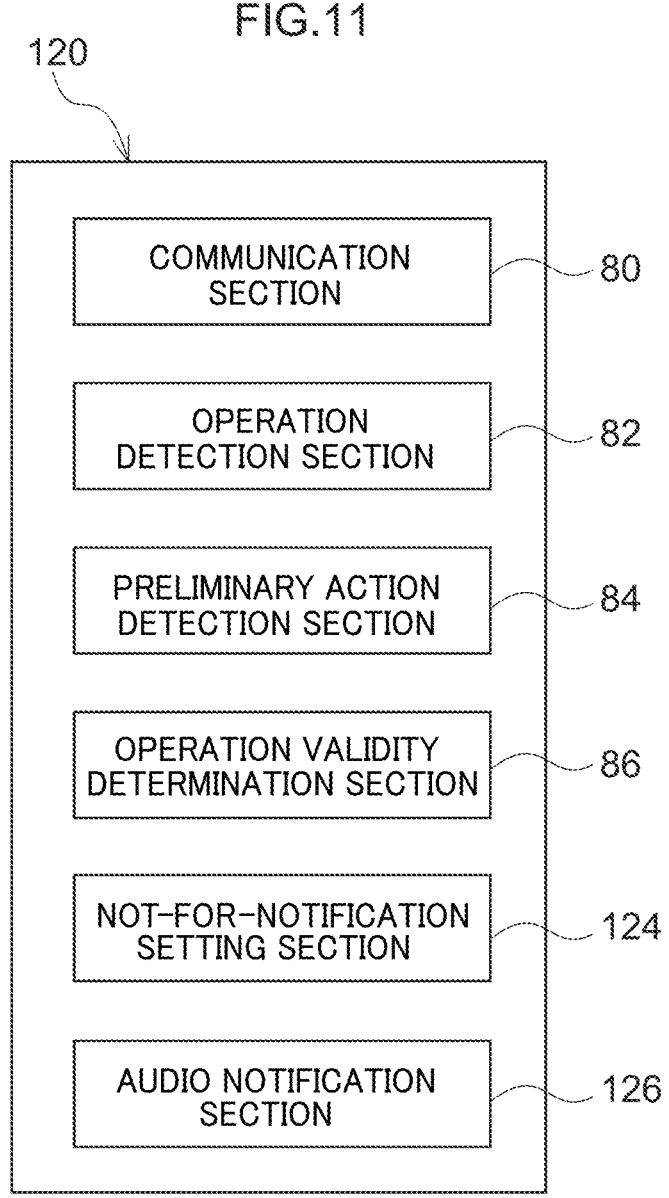

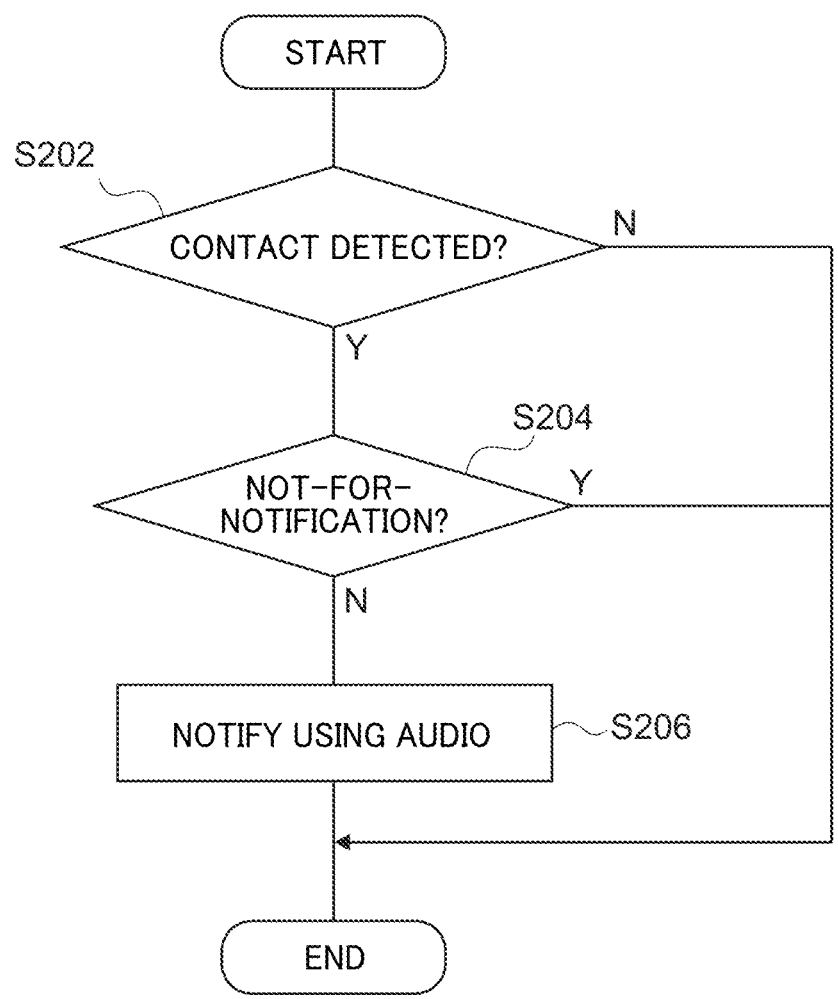

VEHICLE INPUT DEVICE, VEHICLE INPUT METHOD, AND NON-TRANSITORY STORAGE MEDIUM STORED WITH VEHICLE INPUT PROGRAM

CROSS-REFERENCE TO RELATED APPLICATIONS

This application is a continuation of U.S. patent application Ser. No. 17/073,399, filed Oct. 19, 2020, which claims the benefit of priority of the prior Japanese Patent Application No. 2019-203457, filed on Nov. 8, 2019, the disclosures of which applications are hereby incorporated by reference herein in their entirety.

BACKGROUND

Technical Field

The present disclosure relates to a vehicle input device.

For example, Japanese Patent Application Laid-Open (JP-A) No. 2006-315562 discloses an in-vehicle input device in which plural switches are provided at a steering wheel. In this in-vehicle input device, the placement of options on a virtual screen displayed on a front windshield by a head-up display corresponds with the placement of the switches.

When there is a correspondence relationship between positions on a virtual screen and the positions of switches (operation sections) as in the in-vehicle input device disclosed in JP-A No. 2006-315562, an occupant can more easily operate a desired switch while keeping their gaze directed toward the front. However, the likelihood of erroneous input increases if the plural switches are disposed close together.

SUMMARY

The present disclosure obtains a vehicle input device capable of suppressing erroneous input during operation without the need to greatly shift one's gaze when driving in a case in which plural operation sections are disposed close together.

A vehicle input device of a first aspect includes an operation detection section configured to detect input to an onboard unit allocated to one operation section of plural of operation sections provided in a vicinity of a driving seat due to the one operation section being operated, a preliminary action detection section configured to detect a preliminary action directly prior to the one operation section being operated, and a notification section configured to notify an occupant of information relating to the onboard unit allocated to the one operation section in a case in which the preliminary action has been detected by the preliminary action detection section.

In the vehicle input device of the first aspect, the plural operation sections are provided in the vicinity of the driving seat. Input to the onboard unit allocated to the one operation section is detected by the operation detection section when the one operation section is operated by the occupant.

The preliminary action directly prior to the one operation section being operated is detected by the preliminary action detection section. The occupant is then notified of the information relating to the onboard unit allocated to the one operation section by the notification section. The occupant is therefore able to ascertain the information relating to the onboard unit allocated to the one operation section directly prior to the one operation section being operated without diverting their eyes toward the operation section. Note that the "operation" referred to here is, for example, a concept encompassing pressing the operation section or touching the operation section. Moreover, the "onboard unit" referred to here is, for example, a concept encompassing travel assist equipment such as active cruise control (ACC) and lane tracing assist (LTA) in addition to other equipment such as an air conditioner, an audio system, a car navigation system, or an audio input device.

A vehicle input device of a second aspect is the first aspect, further including a display section provided at a vehicle front side of the driving seat, and wherein the notification section is configured to notify the occupant by displaying the information relating to the onboard unit allocated to the one operation section on the display section.

In the vehicle input device of the second aspect, the information relating to the onboard unit allocated to the one operation section is displayed on the display section at the vehicle front of the driving seat in a case in which the preliminary action directly prior to the one operation section being operated has been detected by the preliminary action detection section. This enables the occupant to ascertain the information relating to the onboard unit allocated to the operation section they are about to operate by looking at the display section.

A vehicle input device of a third aspect is the second aspect, wherein the operation detection section is configured to detect input to the onboard unit allocated to the one operation section due to the one operation section being pressed, and the preliminary action detection section is configured to detect touching of the one operation section by the occupant as the preliminary action directly prior to the one operation section being pressed.

In the vehicle input device of the third aspect, the information relating to the onboard unit allocated to the operation section that is being touched is displayed on the display section when the occupant touches the one operation section. This enables the occupant to ascertain the information relating to the onboard unit they are about to operate by touching the one operation section. From the touched state, input to the onboard unit is then performed by pressing the operation section.

A vehicle input device of a fourth aspect is the third aspect, wherein an image is displayed on the display section to represent each of the plural operation sections, and the notification section is configured to emphatically display the image corresponding to the one operation section that the occupant is touching.

In the vehicle input device of the fourth aspect, an image is displayed on the display section to represent each of the plural operation sections. The notification section emphatically displays the image corresponding to the one operation section that the occupant is touching. This enables the occupant to ascertain which of the operation sections they are touching by looking at the display section.

A vehicle input device of a fifth aspect is the third aspect or the fourth aspect, wherein the notification section is configured to display on the display section at least one of an icon or text indicating the onboard unit allocated to the one operation section being touched by the occupant.

In the vehicle input device of the fifth aspect, the notification section displays on the display section the at least one of an icon or text for the information relating to the onboard unit allocated to the one operation section being touched by the occupant. This enables the occupant to see the at least one of an icon or text displayed on the display section.

A vehicle input device of a sixth aspect is the fifth aspect, wherein a different function is allocated to at least one operation section of the plural operation sections when the at least one of an icon or text displayed on the display section is switched.

In the vehicle input device of the sixth aspect, a different function is allocated to the operation section when the at least one of the icon or text displayed on the display section is switched. Namely, plural functions can be allocated to a single operation section.

A vehicle input device of a seventh aspect is the fifth aspect or the sixth aspect, wherein at least one operation section of the plural operation sections is switched to an inoperable state when the at least one of an icon or text displayed on the display section is categorized as not-for-display.

In the vehicle input device of the seventh aspect, the at least one operation section of the operation sections is switched to the inoperable state when the at least one of the icon or text displayed on the display section is categorized as not-for-display. This enables the occupant to ascertain the operation section that is inoperable by looking at the display section. Note that "inoperable" here is a concept encompassing cases in which although pressing is physically possible, such pressing does not result in input to the allocated onboard unit.

A vehicle input device of an eighth aspect is of any one of the second aspect to the seventh aspect, wherein the display section is a display screen projected from a head-up display onto a partial region of a windshield.

In the vehicle input device of the eighth aspect, information relating to the onboard unit allocated to the operation section that is about to be operated is displayed on the windshield. This enables the occupant to ascertain the information while keeping their gaze directed toward the scene ahead of the vehicle.

A vehicle input device of a ninth aspect is of any one of the first aspect to the eighth aspect, wherein the plural operation sections are provided at a steering wheel provided at a vehicle front of the driving seat.

In the vehicle input device of the ninth aspect, the plural operation sections are provided at the steering wheel, and input to the onboard unit allocated to the operation section is detected by the operation detection section when the operation section is operated.

As described above, the vehicle input device according to the first aspect is capable of suppressing erroneous input during operation without the need to greatly shift one's gaze when driving in a case in which plural operation sections are disposed close together.

The vehicle input device according to the second aspect is capable of suppressing erroneous input since the occupant looks at the information displayed on the display section while driving.

The vehicle input device according to the third aspect enables the occupant to ascertain the information relating to the onboard unit allocated to the one operation section without performing a deliberate action directly prior to operating the one operation section.

The vehicle input device according to the fourth aspect enables the operation section that is being touched to be easily ascertained.

The vehicle input device according to the fifth aspect enables the occupant to reliably ascertain the information relating to the onboard unit that they are about to operate while keeping their gaze directed ahead of the vehicle.

The vehicle input device according to the sixth aspect enables the number of operation sections to be decreased in comparison to cases in which only a single function is allocated to a single operation section.

The vehicle input device according to the seventh aspect enables the occupant to easily check operable operation sections and input-disabled operation sections while looking ahead of the vehicle.

The vehicle input device according to the eighth aspect enables the occupant to look at the information displayed on the display section while keeping their gaze directed toward the scene ahead of the vehicle.

The vehicle input device according to the ninth aspect enables the occupant to perform input to the onboard unit in a while gripping the steering wheel.

BRIEF DESCRIPTION OF THE DRAWINGS

Exemplary embodiments of the present invention will be described in detail based on the following figures, wherein:

FIG. 11 is a block diagram illustrating a functional configuration of a vehicle input device according to the second exemplary embodiment; and FIG. 12 is a flowchart illustrating an example of a flow of audio notification processing by a vehicle input device according to the second exemplary embodiment.

DETAILED DESCRIPTION

First Exemplary Embodiment

Figure 1:
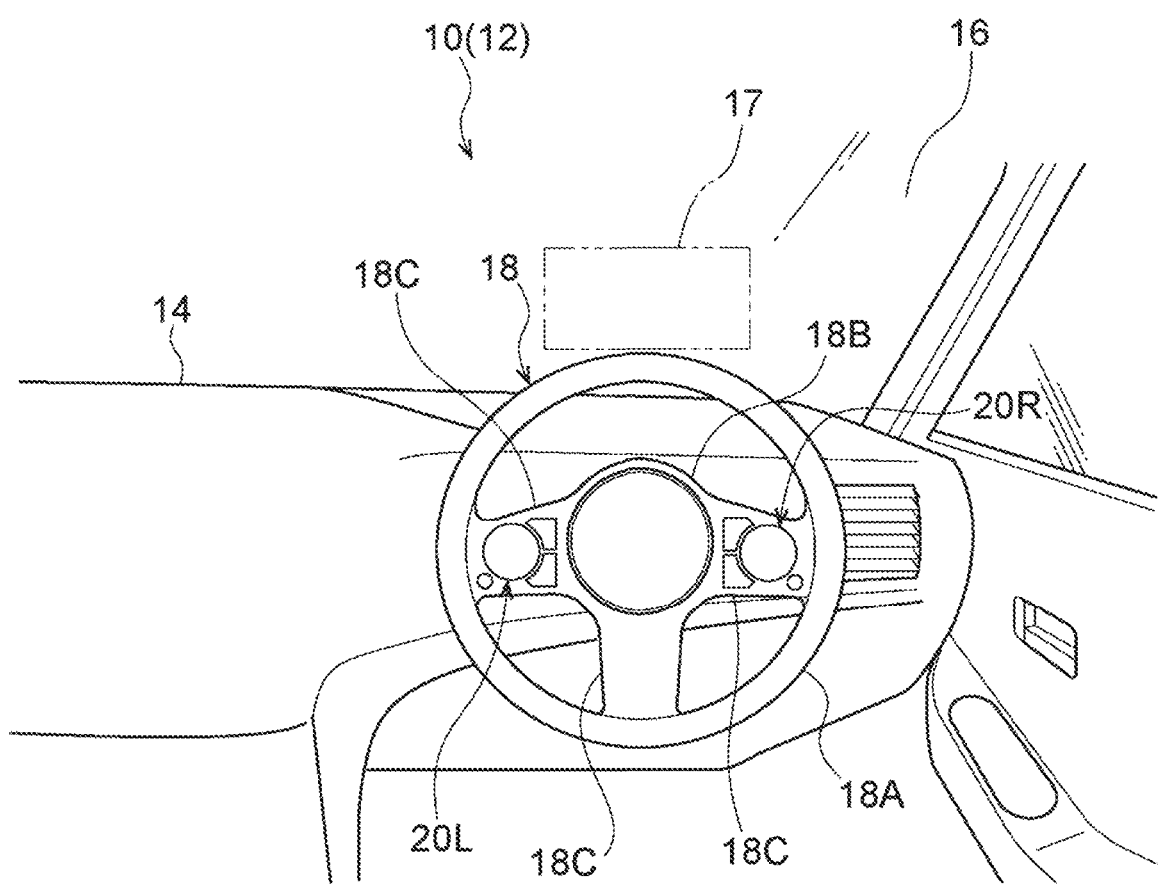
FIG. 1 is a diagram illustrating a front section of a vehicle cabin of a vehicle applied with a vehicle input device according to a first exemplary embodiment, as viewed from a vehicle rear side.

Explanation follows regarding a vehicle input device 10 according to a first exemplary embodiment, with reference to the drawings. As illustrated in FIG. 1, an instrument panel 14 is installed in a front section of a vehicle cabin of a vehicle 12 applied with the vehicle input device 10 of the present exemplary embodiment. A windshield 16 is installed at a front end portion of the instrument panel 14. The windshield 16 extends along a vehicle vertical direction and a vehicle width direction so as to partition the vehicle cabin interior from the vehicle cabin exterior.

A display screen 17, serving as a display section, is set on the windshield 16. The display screen 17 is a screen set in a region of the windshield 16 at a vehicle front side of a driving seat, and serves as a screen where images from a head-up display 19 (see FIG. 7) are projected onto a partial region of the windshield 16.

A steering wheel 18 is provided on the driving seat side (vehicle right side) of the instrument panel 14 through a non-illustrated steering column. The steering wheel 18 includes a substantially annular rim 18A. A hub 18B configuring a central portion is provided at an inner peripheral side of the rim 18A. The rim 18A and the hub 18B are coupled together by plural spokes 18C (three in the present exemplary embodiment).

The spokes 18C are provided at three locations, namely between the right side of the rim 18A and the hub 18B, between the left side of the rim 18A and the hub 18B, and between the lower side of the rim 18A and the hub 18B. Note that right-hand switches 20R are provided at the spoke 18C between the right side of the rim 18A and the hub 18B. Left-hand switches 20L are provided at the spoke 18C between the left side of the rim 18A and the hub 18B. The right-hand switches 20R and the left-hand switches 20L are described in detail later.

Hardware Configuration

Figure 7:
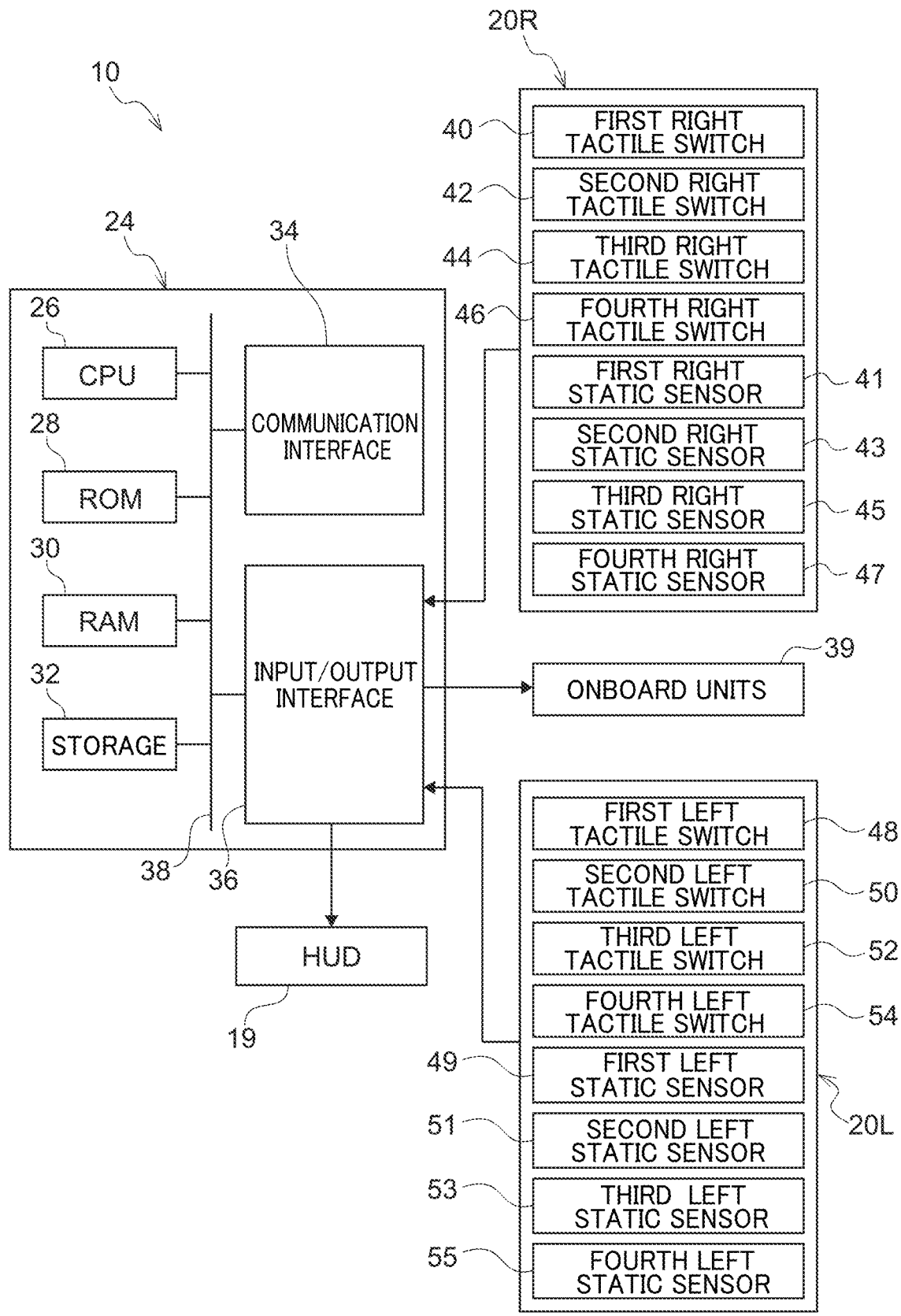
FIG. 7 is a block diagram illustrating a hardware configuration of a vehicle input device according to the first exemplary embodiment.

FIG. 7 is a block diagram illustrating hardware configuration of the vehicle input device 10. As illustrated in FIG. 7, the vehicle input device 10 includes an electronic control unit (ECU) 24 serving as a control section. The ECU 24 is configured including a central processing unit (CPU) 26, read only memory (ROM) 28, random access memory (RAM) 30, storage 32, a communication interface 34, and an input/output interface 36. The respective configuration elements are connected so as to be capable of communicating with each other through a bus 38.

The CPU 26 is a central processing unit for executing various programs and controlling various sections. Namely, the CPU 26 serves as a processor that reads a program from the ROM 28 or the storage 32, and executes the program using the RAM 30 as a workspace. The CPU 26 controls the respective configuration elements and performs various computational processing according to the program recorded in the ROM 28 or the storage 32.

The ROM 28 holds various programs and various data. The RAM 30 serves as a workspace to temporarily store programs or data. The storage 32 is configured by a hard disk drive (HDD) or a solid state drive (SSD), and holds various programs including an operating system, as well as various data.

The communication interface 34 is an interface allowing the ECU 24 to communicate with a server and other devices, and employs a protocol such as Ethernet (registered trademark), FDDI, or Wi-Fi (registered trademark).

The head-up display (HUD) 19, onboard units 39, the right-hand switches 20R, and the left-hand switches 20L are connected to the input/output interface 36. Specifically, the input/output interface 36 is connected to the HUD 19 that projects an image onto the display screen 17. On receiving a signal from the ECU 24, the HUD 19 projects an image onto the display screen 17. The onboard units 39 is a collective term encompassing travel assist equipment such as active cruise control (ACC) and lane tracing assist (LTA) in addition to other equipment such as an air conditioner, an audio system, a car navigation system, and an audio input device.

The right-hand switches 20R include a first right tactile switch 40. The right-hand switches 20R also include a second right tactile switch 42, a third right tactile switch 44, and a fourth right tactile switch 46, each serving as operation section and configured by a contact detection switch. The right-hand switches 20R also include a first right static sensor 41, a second right static sensor 43, a third right static sensor 45, and a fourth right static sensor 47.

Figure 2:
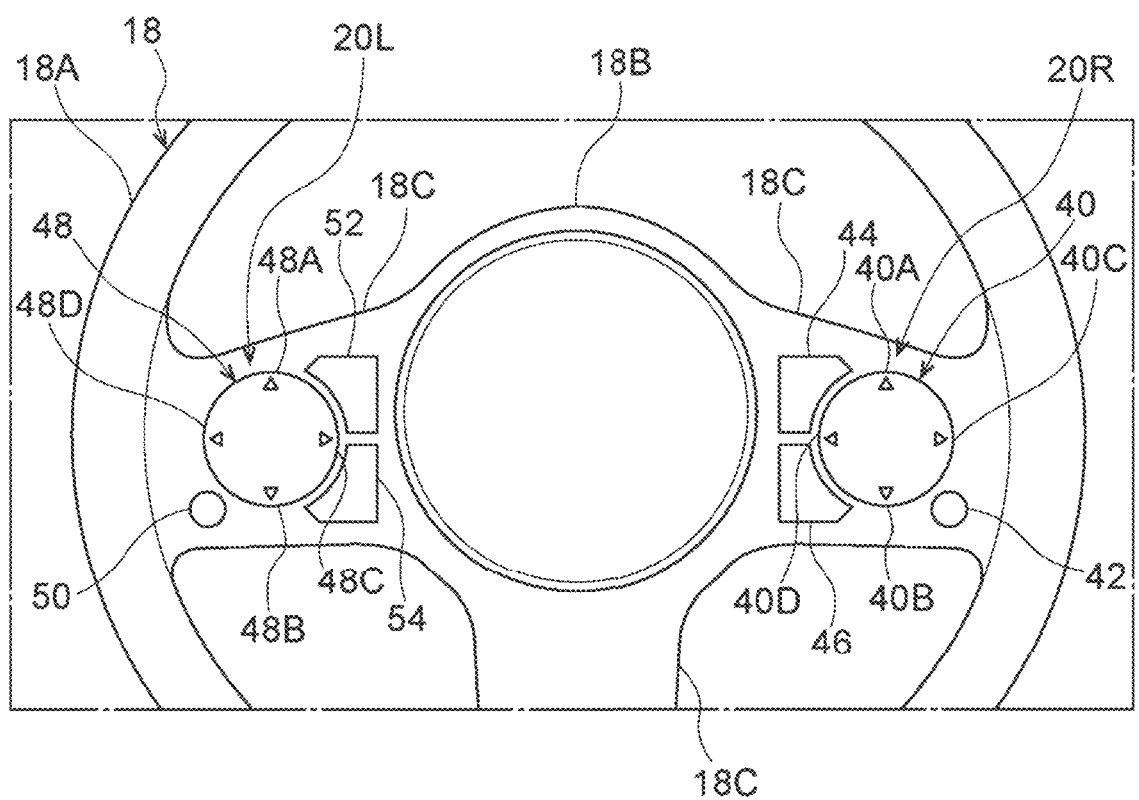
FIG. 2 is an enlarged view illustrating relevant portions of part of the steering wheel in FIG. 1.

As illustrated in FIG. 2, the first right tactile switch 40 is formed in a substantially circular shape, and includes an upper button 40A, a lower button 40B, a right button 40C, and a left button 40D, serving as operation sections. The first right tactile switch 40 is thereby configured so as to be capable of being pressed at the top, bottom, left, and right thereof. These buttons are mainly employed when operating driving assist equipment.

The first right static sensor 41 is provided at the first right tactile switch 40 so as to enable detection of when an occupant has touched the first right tactile switch 40. Specifically, the first right static sensor 41 is capable of detecting which button the occupant has touched out of the upper button 40A, the lower button 40B, the right button 40C, or the left button 40D of the first right tactile switch 40. Note that the functions allocated to the upper button 40A, the lower button 40B, the right button 40C, and the left button 40D change when an image (at least one of an icon or text) displayed on the display screen 17 is switched.

When the steering wheel 18 is viewed face-on, the second right tactile switch 42 is installed at the lower-right of the first right tactile switch 40, and is formed in a substantially circular shape with a smaller diameter than the first right tactile switch 40. The second right tactile switch 42 of the present exemplary embodiment is allocated a function of switching the image displayed on the display screen 17 when pressed. Namely, a layer displayed on the display screen 17 is switched. The second right static sensor 43 is provided at the second right tactile switch 42 so as to enable detection of when the occupant has touched the second right tactile switch 42.

When the steering wheel 18 is viewed face-on, the third right tactile switch 44 is installed at the upper-left of the first right tactile switch 40, and is formed substantially in the shape of a rectangle beveled at a lower-right corner. The third right tactile switch 44 of the present exemplary embodiment is allocated a function of actuating the ACC when pressed. The third right static sensor 45 is provided at the third right tactile switch 44 so as to enable detection of when the occupant has touched the third right tactile switch 44.

The fourth right tactile switch 46 is installed below the third right tactile switch 44, and is formed substantially in the shape of a rectangle beveled at an upper-right corner. The fourth right tactile switch 46 of the present exemplary embodiment is allocated a function of actuating the LTA when pressed. The fourth right static sensor 47 is provided at the fourth right tactile switch 46 so as to enable detection of when the occupant has touched the fourth right tactile switch 46.

As illustrated in FIG. 7, the left-hand switches 20L include a first left tactile switch 48. The left-hand switches 20L also include a second left tactile switch 50, a third left tactile switch 52, and a fourth left tactile switch 54, each serving as operation section and configured by a contact detection switch. The left-hand switches 20L also include a first left static sensor 49, a second left static sensor 51, a third left static sensor 53, and a fourth left static sensor 55.

As illustrated in FIG. 2, the first left tactile switch 48 is formed in a substantially circular shape, and includes an upper button 48A, a lower button 48B, a right button 48C, and a left button 48D, serving as operation sections. The first left tactile switch 48 is thereby configured so as to be capable of being pressed at the top, bottom, left, and right thereof.

The first left static sensor 49 is provided at the first left tactile switch 48 so as to enable detection of when the occupant has touched the first left tactile switch 48. Specifically, the first left static sensor 49 is capable of detecting which button the occupant has touched out of the upper button 48A, the lower button 48B, the right button 48C, or the left button 48D of the first left tactile switch 48. Note that the operations allocated to the upper button 48A, the lower button 48B, the right button 48C, and the left button 48D change according to the layer displayed on the display screen 17.

When the steering wheel 18 is viewed face-on, the second left tactile switch 50 is installed at the lower-left of the first left tactile switch 48, and is formed in a substantially circular shape with a smaller diameter than the first left tactile switch 48. The second left tactile switch 50 of the present exemplary embodiment is allocated a function of changing the image layer displayed on the display screen 17 when pressed. The second left static sensor 51 is provided at the second left tactile switch 50 so as to enable detection of when the occupant has touched the second left tactile switch 50.

When the steering wheel 18 is viewed face-on, the third left tactile switch 52 is installed at the upper-right of the first left tactile switch 48, and is formed substantially in the shape of a rectangle beveled at a lower-left corner. The third left tactile switch 52 is allocated a function of raising the volume when pressed. The third left static sensor 53 is provided at the third left tactile switch 52 so as to enable detection of when the occupant has touched the third left tactile switch 52.

The fourth left tactile switch 54 is installed below the third left tactile switch 52, and is formed substantially in the shape of a rectangle beveled at an upper-left corner. The fourth left tactile switch 54 is allocated a function of lowering the volume when pressed. The fourth left static sensor 55 is provided at the fourth left tactile switch 54 so as to enable detection of when the occupant has touched the fourth left tactile switch 54.

Functional Configuration

The vehicle input device employs the hardware resources illustrated in FIG. 7 to implement various functionality. Explanation follows regarding the functional configuration implemented by the vehicle input device, with reference to FIG. 8.

Figure 8:
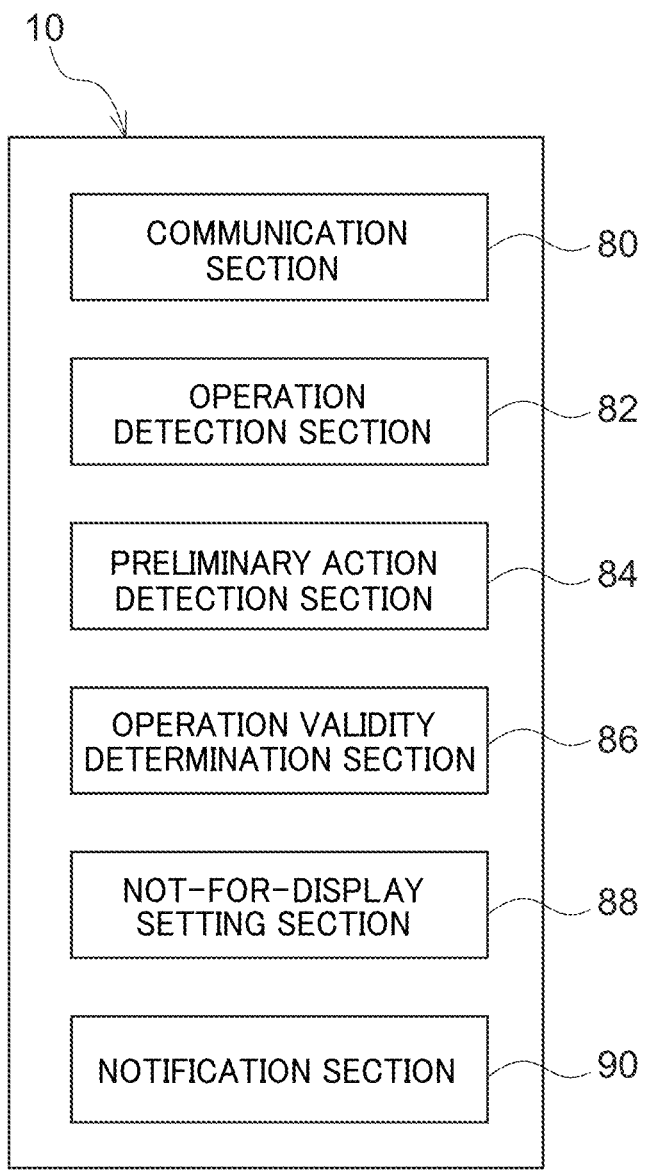
FIG. 8 is a block diagram illustrating a functional configuration of a vehicle input device according to the first exemplary embodiment.

As illustrated in FIG. 8, functional configurations of the vehicle input device 10 include a communication section 80, an operation detection section 82, a preliminary action detection section 84, an operation validity determination section 86, a not-for-display setting section 88, and a notification section 90. The respective functional configurations are implemented by the CPU 26 of the ECU 24 reading a program stored in the ROM 28 or the storage 32, and executing this program.

The communication section 80 communicates with the server, equipment external to the vehicle, and so on, through the communication interface 34. When one switch out of the right-hand switches 20R or the left-hand switches 20L is touched or pressed, the operation detection section 82 detects input to the onboard unit 39 that corresponds to the touched or pressed right-hand switch 20R or left-hand switch 20L. Specifically, input is detected when a signal is received from the first right tactile switch 40, the second right tactile switch 42, the third right tactile switch 44, or the fourth right tactile switch 46 of the right-hand switches 20R. Alternatively, input is detected when a signal is received from the first left tactile switch 48, the second left tactile switch 50, the third left tactile switch 52, or the fourth left tactile switch 54 of the left-hand switches 20L.

The preliminary action detection section 84 detects a preliminary action directly prior to a right-hand switch 20R being pressed, and a preliminary action directly prior to a left-hand switch 20L being pressed. Specifically, as a preliminary action, the preliminary action detection section 84 detects a state in which a switch is touched directly prior to being pressed when a signal is received from the corresponding first right static sensor 41, second right static sensor 43, third right static sensor 45, or fourth right static sensor 47. Similarly, as a preliminary action, the preliminary action detection section 84 detects a state in which a switch is touched directly prior to being pressed when a signal is received from the corresponding first left static sensor 49, second left static sensor 51, third left static sensor 53, or fourth left static sensor 55. For example, when the occupant has touched at least one switch out of the right-hand switches 20R or the left-hand switches 20L, the corresponding sensor detects this as a preliminary action directly prior to this switch being pressed.

When input to the corresponding onboard unit 39 has been detected by the functionality of the operation detection section 82, the operation validity determination section 86 determines whether or not an operation is possible. Namely, the first right tactile switch 40 and the first left tactile switch 48 are allocated different functions depending on the layer displayed on the display screen 17, and may be switched to an inoperable state in some layers. The operation validity determination section 86 determines whether or not the first right tactile switch 40 or the first left tactile switch 48 is in an inoperable state in which input cannot be accepted.

The not-for-display setting section 88 sets not-for-display items corresponding to some of the information displayable on the display screen 17. Specifically, each of the switches is pre-set with content categorized as not-for-display depending on the layer. The not-for-display setting section 88 is capable of determining whether or not content is categorized as not-for-display by referring to values of these settings.

In a case in which a preliminary action has been detected by the functionality of the preliminary action detection section 84, the notification section 90 notifies the occupant of information relating to the onboard unit 39 corresponding to the right-hand switch 20R or the left-hand switch 20L that is expected to be pressed. Specifically, the notification section 90 notifies the occupant visually by displaying information relating to the onboard unit 39 on the display screen 17 provided at the vehicle front side of the driving seat.

Explanation Regarding Display Information

Figure 3:
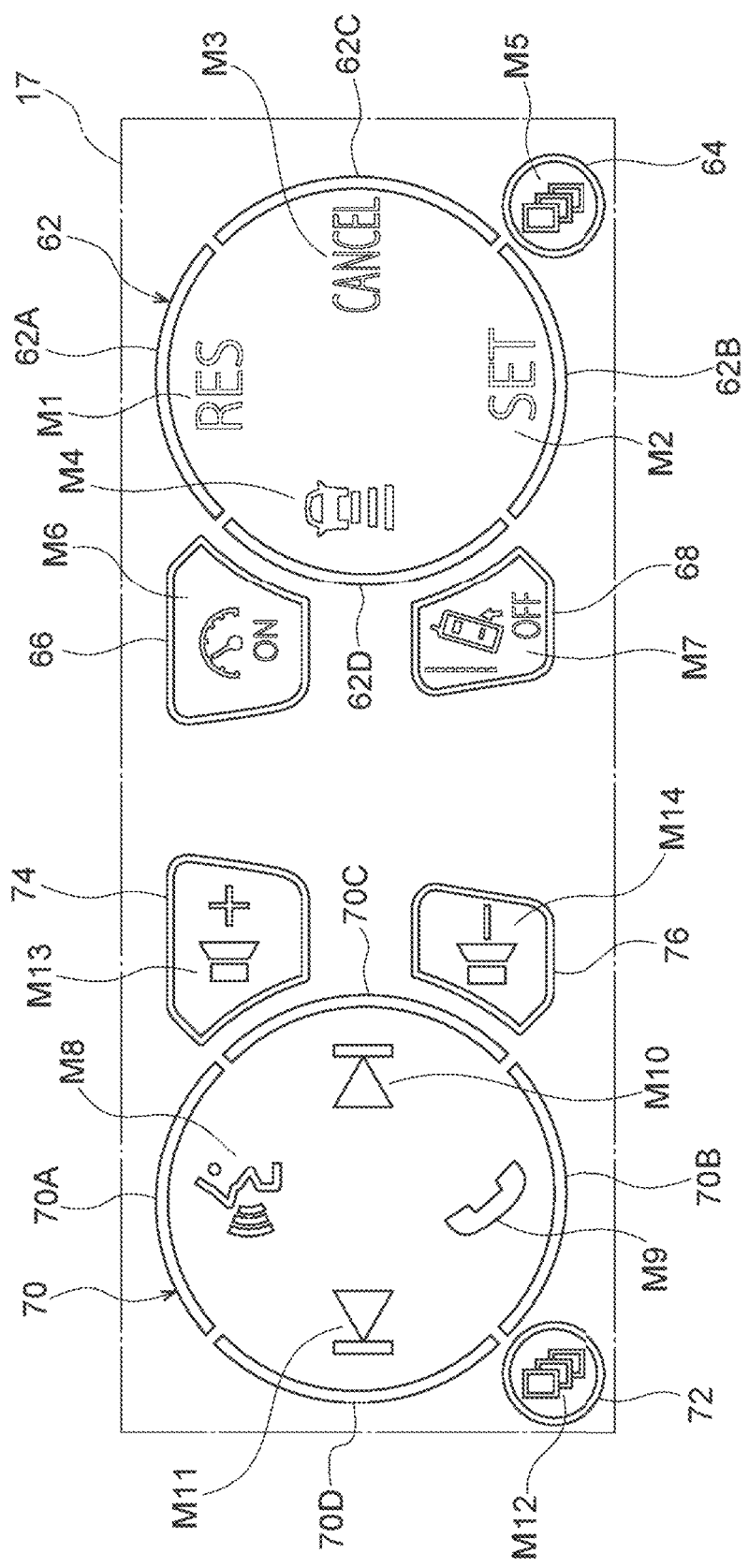
FIG. 3 is a diagram illustrating an example of display on a display section of the first exemplary embodiment, and illustrates left-hand switches in a first layer and right-hand switches in a first layer.

Explanation follows regarding an example of display information displayed on the display screen 17 of the present exemplary embodiment, with reference to FIG. 3 to FIG. 6. FIG. 3 illustrates an image of a first layer menu screen corresponding to the right-hand switches 20R and an image of a first layer menu screen corresponding to the left-hand switches 20L.

A first right frame 62 corresponding to the first right tactile switch 40 is displayed on the right side of the display screen 17. The first right frame 62 is configured including an upper arc portion 62A, a lower arc portion 62B, a right arc portion 62C, and a left arc portion 62D. The upper arc portion 62A, the lower arc portion 62B, the right arc portion 62C, and the left arc portion 62D respectively correspond to the upper button 40A, the lower button 40B, the right button 40C, and the left button 40D of the first right tactile switch 40.

Note that an icon M1 is displayed close to the upper arc portion 62A. The icon M1 has a design representing the letters "RES". Namely, the icon M1 corresponds to a "resume" function. An icon M2 is displayed close to the lower arc portion 62B. The icon M2 has a design representing the letters "SET". Namely, the icon M2 corresponds to a "set" function.

An icon M3 is displayed close to the right arc portion 62C. The icon M3 has a design representing the letters "CANCEL". Namely, the icon M3 corresponds to a "cancel" function. An icon M4 is displayed close to the left arc portion 62D. The icon M4 has a design representing a vehicle and radar. The icon M4 corresponds to a function of detecting information regarding the surroundings of the vehicle.

A second right frame 64 corresponding to the second right tactile switch 42 is displayed at the lower-right of the first right frame 62. An icon M5 is displayed inside the second right frame 64. The icon M5 represents overlapping rectangular shapes, and corresponds to a function of changing the layer displayed on the display screen 17.

A third right frame 66 corresponding to the third right tactile switch 44 is displayed at the upper-left of the first right frame 62. An icon M6 is displayed inside the third right frame 66. The icon M6 has a design representing a vehicle meter, and corresponds to the ACC function.

A fourth right frame 68 corresponding to the fourth right tactile switch 46 is displayed at the lower-left of the first right frame 62. An icon M7 is displayed inside the fourth right frame 68. The icon M7 has a design representing a vehicle and a vehicle lane, and corresponds to the LTA function. These icons M1 to M7 are icons corresponding to the right-hand switches 20R when a first layer is on the display screen 17.

A first left frame 70 corresponding to the first left tactile switch 48 is displayed on the left side of the display screen 17. The first left frame 70 is configured including an upper arc portion 70A, a lower arc portion 70B, a right arc portion 70C, and a left arc portion 70D. The upper arc portion 70A, the lower arc portion 70B, the right arc portion 70C, and the left arc portion 70D respectively correspond to the upper button 48A, the lower button 48B, the right button 48C, and the left button 48D of the first left tactile switch 48.

Note that an icon M8 is displayed close to the upper arc portion 70A. The icon M8 has a design representing a state in which an occupant is speaking. Namely, the icon M8 corresponds to a speech recognition function. An icon M9 is displayed close to the lower arc portion 70B. The icon M9 has a design representing a telephone. Namely, the icon M9 corresponds to a telephone call function.

An icon M10 is displayed close to the right arc portion 70C. The icon M10 has a design representing a triangle. The icon M10 corresponds to a function of skipping forward a track. An icon M11 is displayed close to the left arc portion 70D. The icon M11 has left-right symmetry to the shape of the icon M10. The icon M11 corresponds to a function of skipping back a track.

A second left frame 72 corresponding to the second left tactile switch 50 is displayed at the lower-left of the first left frame 70. An icon M12 is displayed inside the second left frame 72. The icon M12 represents overlapping rectangular shapes, and corresponds to a function of changing the layer.

A third left frame 74 corresponding to the third left tactile switch 52 is displayed at the upper-right of the first left frame 70. An icon M13 is displayed inside the third left frame 74. The icon M13 has a design representing a speaker, and corresponds to a function of raising the volume.

A fourth left frame 76 corresponding to the fourth left tactile switch 54 is displayed at the lower-right of the first left frame 70. An icon M14 is displayed inside the fourth left frame 76. The icon M14 has a design representing a speaker, and corresponds to a function of lowering the volume. These icons M8 to M14 are icons corresponding to the left-hand switches 20L when the first layer is on the display screen 17.

Figure 4A:
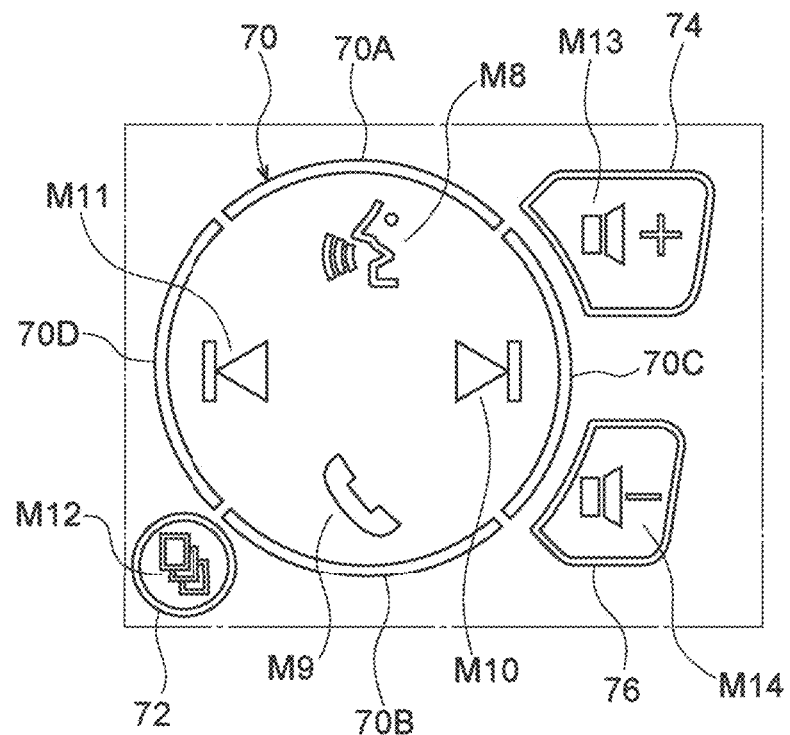
FIG. 4A is a diagram illustrating an example of display on a head-up display of the first exemplary embodiment, and illustrates left-hand switches in a first layer.

In FIG. 4A, the first layer corresponding to the left-hand switches 20L is displayed on the display screen 17. If the occupant presses the second left tactile switch 50 of the left-hand switches 20L in this state, the display screen 17 switches to display of a second layer as illustrated in FIG. 4B.

Figure 4B:
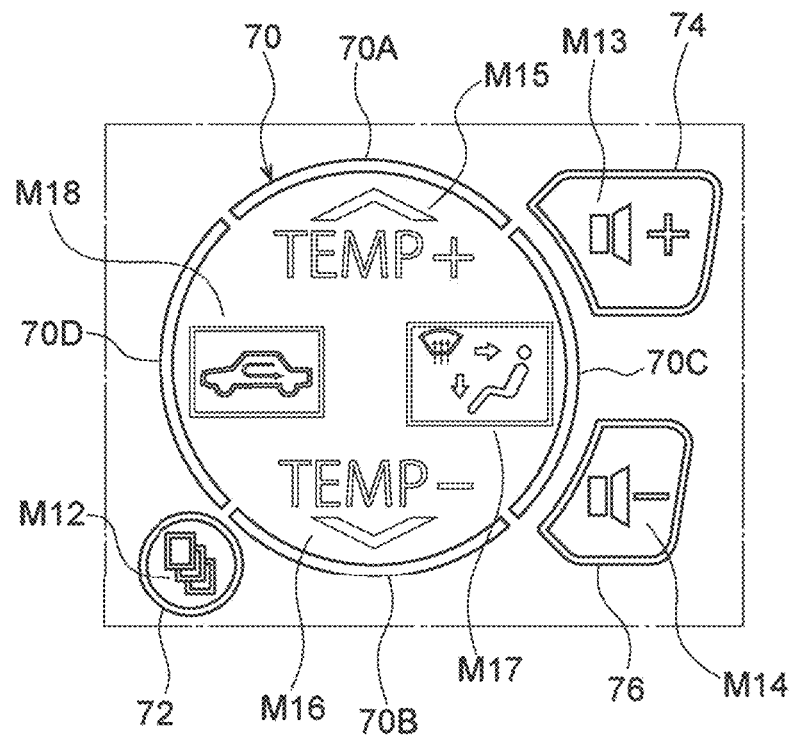
FIG. 4B is a diagram illustrating an example of display on a head-up display of the first exemplary embodiment, and illustrates left-hand switches in a second layer.

As illustrated in FIG. 4B, in the second layer, an icon M15 is displayed in the place of the icon M8. The icon M15 has a design representing the letters "TEMP+", and corresponds to a function of raising the air conditioning temperature. An icon M16 is displayed in the place of the icon M9. The icon M16 has a design representing the letters "TEMP−", and corresponds to a function of lowering the air conditioning temperature.

Moreover, in the second layer, an icon M17 is displayed in the place of the icon M10. The icon M17 has a design representing an occupant and various airflow directions, and corresponds to a function of changing the airflow direction. An icon M18 is displayed in the place of the icon M11. The icon M18 has a design representing a vehicle, and corresponds to a function of circulating air inside the vehicle. Thus, in the present exemplary embodiment, a display relating to air conditioning and corresponding to the left-hand switches 20L is performed when the second layer is on the display screen 17. When a given left-hand switch 20L is pressed or touched, the operation detection section 82 detects this as an operation input according to the layer displayed on the display screen 17.

Figure 5A:
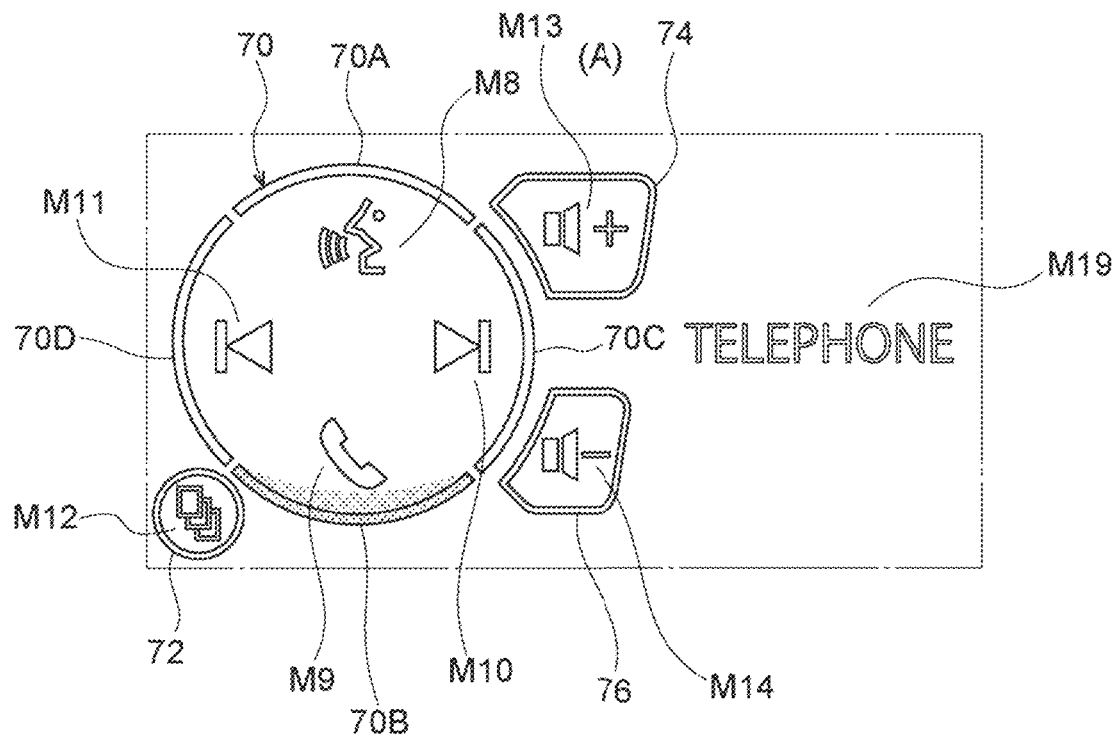
FIG. 5A is a diagram illustrating an example of display on a head-up display of the first exemplary embodiment, and illustrates a state in which a lower button of a first left tactile switch has been touched.

FIG. 5A illustrates a display on the display screen 17 in a state in which the occupant is touching the lower button 48B of the first left tactile switch 48. Namely, in FIG. 5A the first layer corresponding to the left-hand switches 20L is being displayed on the display screen 17. The lower arc portion 70B of the first left frame 70 is emphatically displayed. Specifically, display of the lower arc portion 70B of the first left frame 70 and the periphery of the lower arc portion 70B is lit up. Furthermore, an icon M19 is displayed in a region on the right side of the third left frame 74 and the fourth left frame 76. The icon M19 has a design representing the letters "TELEPHONE", and indicates that this is the telephone call function. This display is performed using the functionality of the notification section 90 in order to display content corresponding to the lower button 48B that is being touched by the occupant. The notification section 90 also displays the position of the first left tactile switch 48 that the occupant is touching on the display screen 17.

Figure 5B:
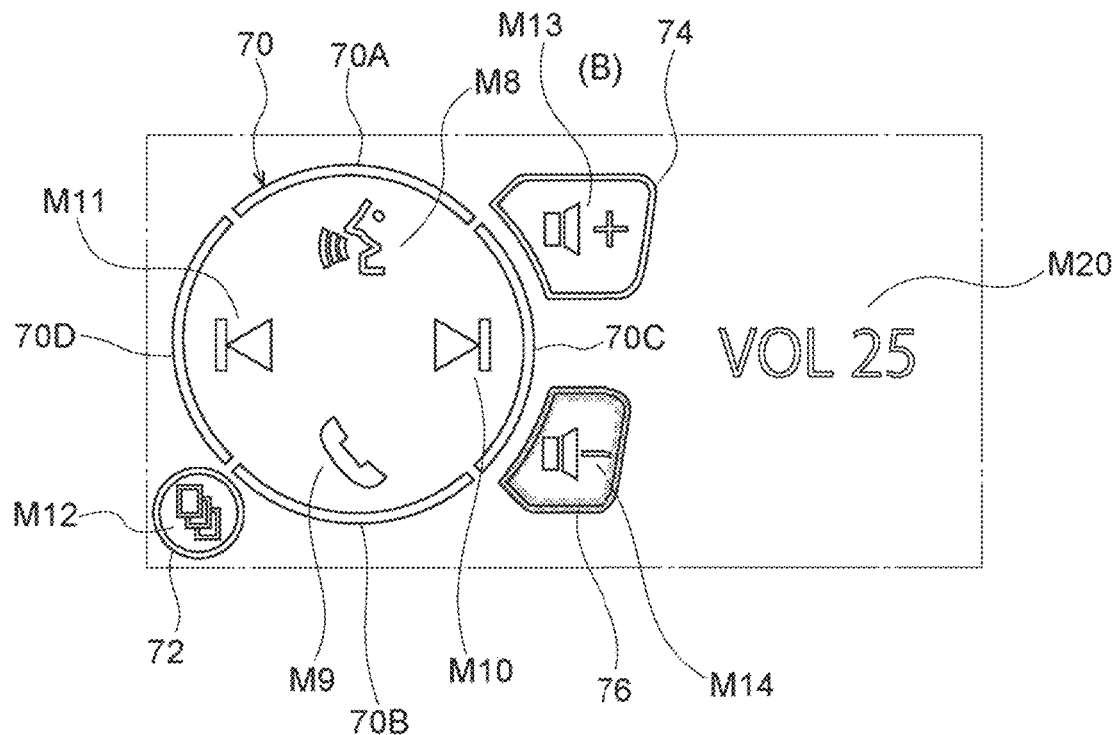
FIG. 5B is a diagram illustrating an example of display on a head-up display of the first exemplary embodiment, and illustrates a state in which a fourth left tactile switch has been touched.

FIG. 5B illustrates a display on the display screen 17 in a state in which the occupant is touching the fourth left tactile switch 54. In FIG. 5B, the first layer corresponding to the left-hand switches 20L is being displayed on the display screen 17. The fourth left frame 76 is emphatically displayed. Specifically, display of the fourth left frame 76 is lit up. Furthermore, an icon M20 is displayed in a region on the right side of the third left frame 74 and the fourth left frame 76. The icon M20 has a design representing the letters "VOL 25", and indicates that the volume level is 25. This display is performed using the functionality of the notification section 90 in order to display content corresponding to the fourth left tactile switch 54 that is being touched by the occupant.

Figure 6A:
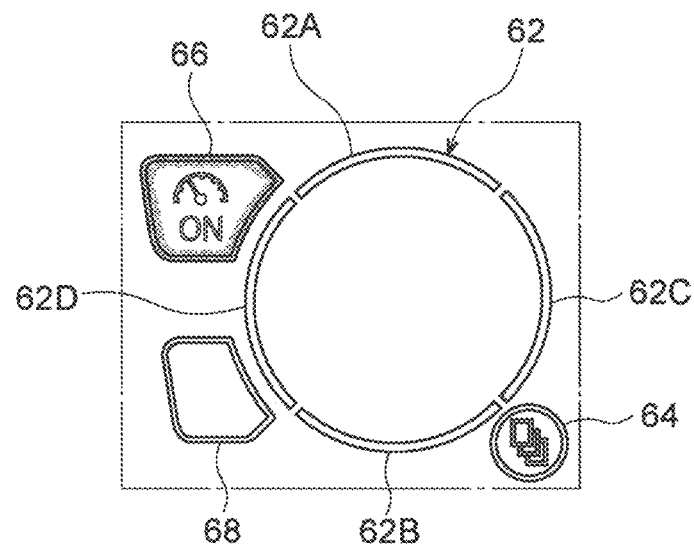
FIG. 6A is a diagram illustrating an example of display on a head-up display of the first exemplary embodiment, and illustrates a state in which a third right tactile switch has been touched.

FIG. 6A illustrates a display on the display screen 17 in a state in which the occupant is touching the third right tactile switch 44. As illustrated in FIG. 6A, icons for functions that cannot be selected are categorized as not-for-display. Namely, the icons M1 to M4 that are respectively allocated to the upper arc portion 62A, the lower arc portion 62B, the right arc portion 62C, and the left arc portion 62D of the first right frame 62 are categorized as not-for-display, based on the functionality of the not-for-display setting section 88. Likewise, the icon M7 inside the fourth right frame 68 is categorized as not-for-display. The third right frame 66 is emphatically displayed. Specifically, display of the third right frame 66 is lit up.

Figure 6B:
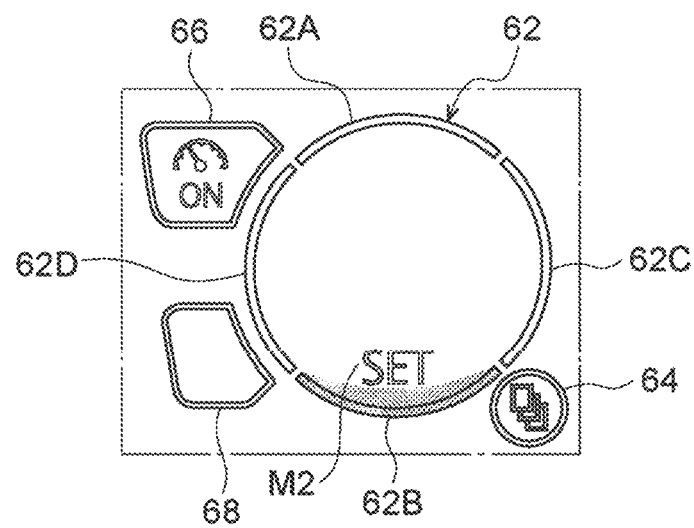
FIG. 6B is a diagram illustrating an example of display on a head-up display of the first exemplary embodiment, and illustrates a state in which a third right tactile switch has been pressed, and a lower button of a first right tactile switch has been touched.

If the occupant presses the third right tactile switch 44 in the state in FIG. 6A, transition is made to the state illustrated in FIG. 6B. In FIG. 6B, the icon M2 allocated to the lower arc portion 62B of the first right frame 62 is displayed. Moreover, since the occupant is touching the lower button 40B of the first right tactile switch 40, the lower arc portion 62B displayed on the display screen 17 is emphatically displayed in FIG. 6B. Specifically, display of the lower arc portion 62B and the periphery of the lower arc portion 62B is lit up.

Figure 6C:
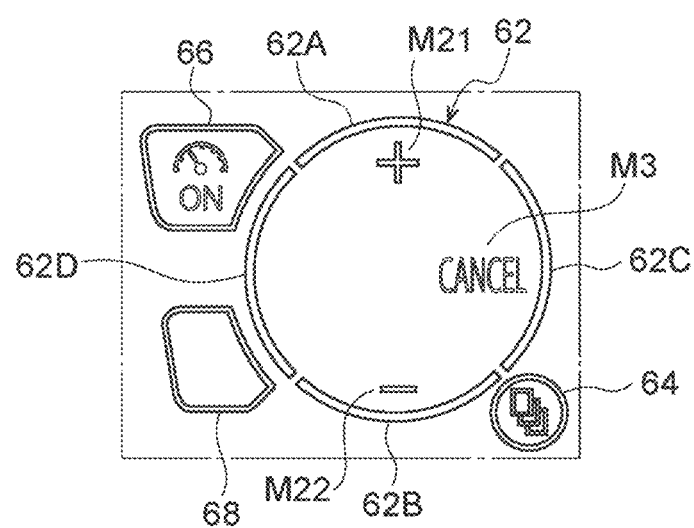
FIG. 6C is a diagram illustrating an example of display on a head-up display of the first exemplary embodiment, and illustrates a state in which a lower button of a first right tactile switch has been pressed.

If the occupant presses the lower button 40B of the first right tactile switch 40 in the state in FIG. 6B, the ACC is set to an actuated state, and transition is made to the state illustrated in FIG. 6C. In FIG. 6C, the icon M3 allocated to the right arc portion 62C of the first right frame 62 is displayed. Moreover, an icon M21 is displayed at the upper arc portion 62A, and an icon M22 is displayed at the lower arc portion 62B. The icon M21 has a design representing the sign "+", and the icon M22 has a design representing the sign "−". If the upper button 40A of the first right tactile switch 40 is pressed, the ACC setting speed is raised, whereas if the lower button 40B of the first right tactile switch 40 is pressed the ACC setting speed is lowered.

Example of Display Processing

Figure 9:
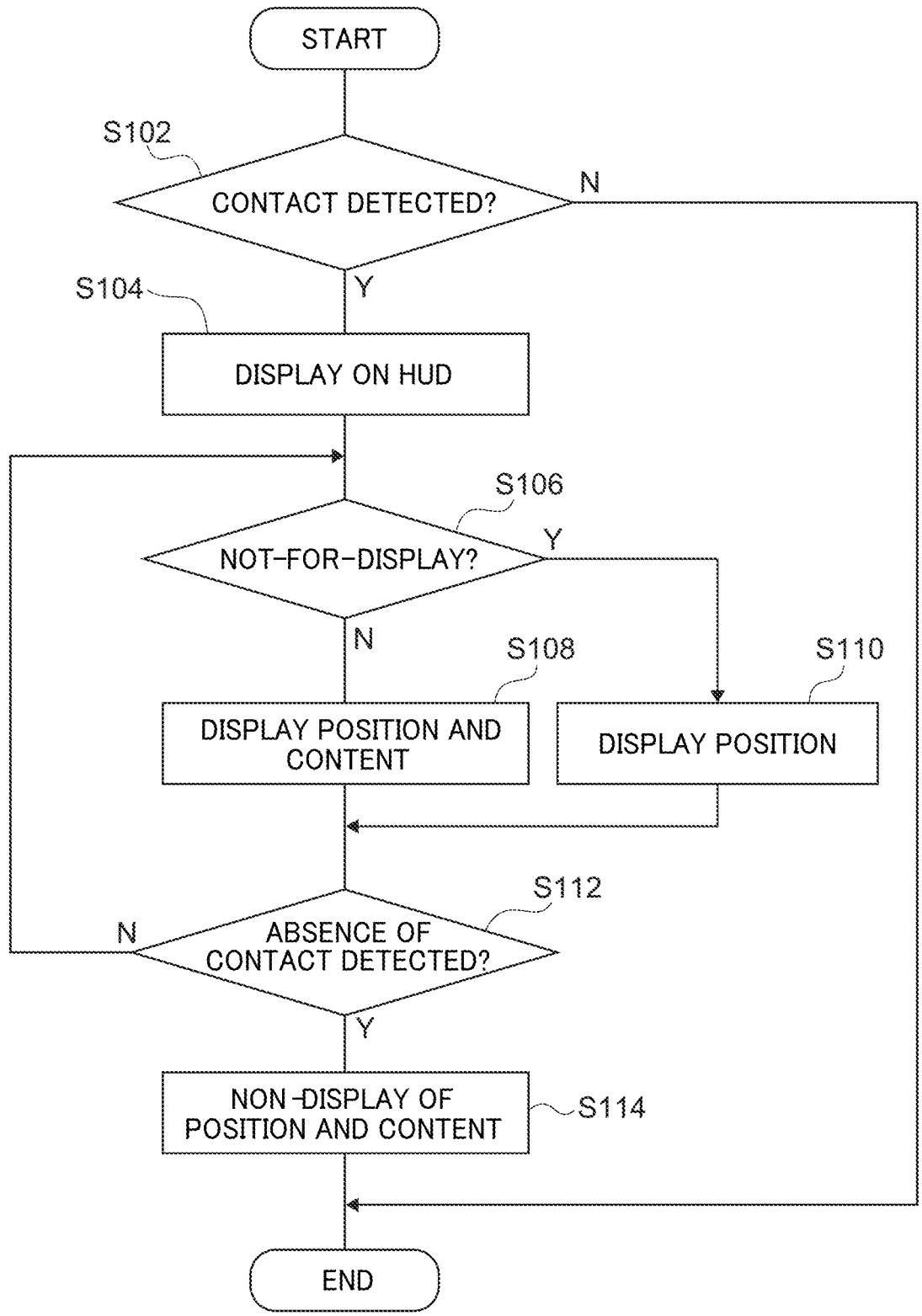
FIG. 9 is a flowchart illustrating an example of a flow of display processing by a vehicle input device according to the first exemplary embodiment.

Next, explanation follows regarding an example of a flow of display processing by the vehicle input device 10, with reference to the flowchart in FIG. 9. The display processing is for example executed when an ignition switch (the power) of the vehicle 12 is switched on, and is performed by the CPU 26 reading a program from the ROM 28 or the storage 32, and expanding and executing this program in the RAM 30.

As illustrated in FIG. 9, at step S102, the CPU 26 determines whether or not detection has been made of the occupant touching at least one switch out of the right-hand switches 20R or the left-hand switches 20L. Specifically, touching of a right-hand switch 20R is determined to have been detected in a case in which a signal has been received from the first right static sensor 41, the second right static sensor 43, the third right static sensor 45, or the fourth right static sensor 47 using the functionality of the preliminary action detection section 84. Similarly, touching of a left-hand switch 20L is determined to have been detected in a case in which a signal has been received from the first left static sensor 49, the second left static sensor 51, the third left static sensor 53, or the fourth left static sensor 55.

Processing transitions to step S104 in a case in which the CPU 26 determines that touching of at least one switch out of the right-hand switches 20R or the left-hand switches 20L has been detected at step S102. The CPU 26 ends the display processing in a case in which touching of the right-hand switches 20R or the left-hand switches 20L has not been detected at step S102.

At step S104, the CPU 26 displays information on the display screen 17. Specifically, as illustrated in FIG. 3, the CPU 26 displays first layer information corresponding to the right-hand switches 20R and first layer information corresponding to the left-hand switches 20L on the display screen 17.

At step S106, the CPU 26 determines whether or not content corresponding to the switch that has been detected as touched is categorized as not-for-display. Specifically, the CPU 26 determines that the content is categorized as not-for-display in a case in which determination has been made based on the functionality of the operation validity determination section 86 that input cannot be accepted.

Processing transitions to step S110 in a case in which the CPU 26 determines at step S106 that the content corresponding to the switch being touched is categorized as not-for-display. At step S110, the CPU 26 emphatically displays the switch being touched on the display screen 17 using the functionality of the notification section 90. For example, in the state illustrated in FIG. 5A the occupant is touching the lower button 48B of the first left tactile switch 48 (see FIG. 2), and so the CPU 26 lights up the lower arc portion 70B of the first left frame 70 displayed on the display screen 17 in order to emphatically display the image corresponding to the lower button 48B being touched by the occupant. The CPU 26 then transitions to the processing of step S112.

Processing transitions to step S108 in a case in which the CPU 26 determines at step S106 that the content corresponding to the switch being touched is not categorized as not-for-display, namely in a case in which the CPU 26 determines that the content is subject to display. At step S108, the CPU 26 displays both the position and content corresponding to the switch that the occupant is touching on the display screen 17 using the functionality of the notification section 90. For example, in the state illustrated in FIG. 5A, the CPU 26 lights up display of the lower arc portion 70B of the first left frame 70 and also displays the icon M19. The CPU 26 then transitions to the processing of step S112.

Next, at step S112, the CPU 26 determines whether or not transition has been made from the state in which the occupant is touching the at least one switch out of the right-hand switches 20R or the left-hand switches 20L to a non-contact state. Specifically, if the occupant moves their finger away from the switch, a signal is no longer received from the corresponding static sensor, and so the CPU 26 determines that touching is not being detected, namely that the absence of contact is being detected. Processing transitions to step S114 in a case in which the CPU 26 determines at step S112 that the absence of contact is being detected. Processing transitions to step S106 in a case in which the CPU 26 determines at step S112 that the absence of contact is not being detected, since a state in which touching is being detected is ongoing.

At step S114, the CPU 26 changes the position and content corresponding to the switch being touched by the occupant to not-for-display. Specifically, the CPU 26 sets display on the display screen 17 to not-for-display using the functionality of the not-for-display setting section 88. The CPU 26 then ends the display processing.

Operation

Next, explanation follows regarding operation of the present exemplary embodiment.

In the vehicle input device of the present exemplary embodiment, when the occupant presses a right-hand switch 20R or a left-hand switch 20L provided at the steering wheel 18, the corresponding onboard unit 39 is actuated accordingly. Namely, the occupant can perform input to the onboard unit 39 while gripping the steering wheel 18. Moreover, when the occupant touches a right-hand switch 20R or a left-hand switch 20L, this is detected by the preliminary action detection section 84. The occupant is then visually notified of information relating to the onboard unit 39 corresponding to the switch by display by the notification section 90 directly prior to the occupant pressing this right-hand switch 20R or left-hand switch 20L. The occupant is therefore able to accurately ascertain which switch they are about to press without diverting their eyes toward the right-hand switches 20R and the left-hand switches 20L. This enables erroneous input to be suppressed as a result.

Moreover, the occupant is able to ascertain information relating to the corresponding onboard unit 39 directly prior to performing an operation simply by touching at least one switch out of the right-hand switches 20R or the left-hand switches 20L, and then press the at least one switch out of the right-hand switches 20R or the left-hand switches 20L from the touched state in order to perform input to this onboard unit 39. The occupant is therefore able to ascertain information relating to the corresponding onboard unit 39 directly prior to performing an operation without performing a deliberate action, while keeping their gaze directed toward the scene ahead of the vehicle.

Furthermore, in the present exemplary embodiment, an image corresponding to the switch being touched by the occupant is emphatically displayed on the display screen 17. Moreover, information relating to the onboard unit 39 corresponding to the switch being touched by the occupant is displayed on the display screen 17 in the form of at least one of an icon or text. This enables the occupant to ascertain the function allocated to the switch being touched while keeping their gaze directed ahead of the vehicle.

Furthermore, in the present exemplary embodiment, the functions allocated to the first right tactile switch 40 and the first left tactile switch 48 are changed when the layer on the display screen 17 is switched, and so pressing of the same switch is detected as different operations depending on the layer on the display screen 17. Namely, plural functions are set for a single switch. The at least one of the icon or the text displayed on the display screen 17 is categorized as not-for-display when the corresponding right-hand switch 20R or left-hand switch 20L has been switched to an inoperable state. This enables erroneous input to be suppressed while reducing the number of switches.

Second Exemplary Embodiment

Next, explanation follows regarding a vehicle input device 120 according to a second exemplary embodiment. Note that configuration that is similar to that in the first exemplary embodiment is allocated the same reference numerals, and explanation thereof is omitted as appropriate.

Figure 10:
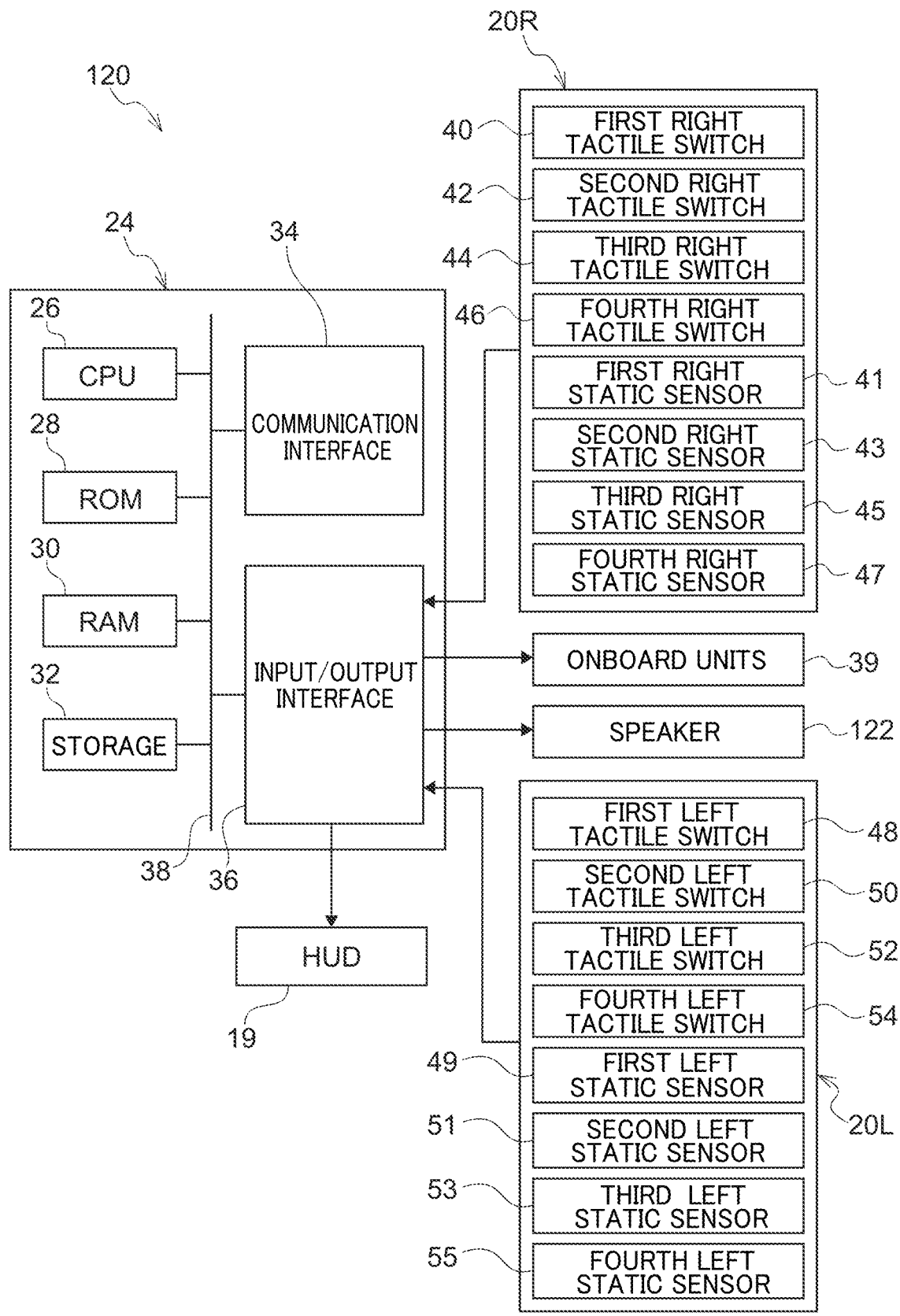
FIG. 10 is a block diagram illustrating a hardware configuration of a vehicle input device according to a second exemplary embodiment.

FIG. 10 is a block diagram illustrating hardware configuration of the vehicle input device 120. As illustrated in FIG. 10, a speaker 122 is connected to the input/output interface 36 in the present exemplary embodiment. The speaker 122 is provided inside the vehicle cabin of the vehicle 12, and is capable of outputting audio information to the occupant. The present exemplary embodiment differs from the first exemplary embodiment in the respect that the occupant is notified of information relating to the corresponding onboard unit 39 in the form of audio directed at the occupant through the speaker 122.

Functional Configuration

The vehicle input device employs the hardware resources illustrated in FIG. 10 to implement various functionality. Explanation follows regarding the functional configurations implemented by the vehicle input device, with reference to FIG. 11.

As illustrated in FIG. 11, functional configurations of the vehicle input device 120 include the communication section 80, the operation detection section 82, the preliminary action detection section 84, the operation validity determination section 86, a not-for-notification setting section 124, and an audio notification section 126 serving as a notification section. The respective functional configurations are implemented by the CPU 26 of the ECU 24 reading a program stored in the ROM 28 or the storage 32, and executing this program.

In a case in which determination is made that input cannot be accepted based on the functionality of the operation validity determination section 86, the not-for-notification setting section 124 sets this as a not-for-notification item. Specifically, notification by audio using the speaker 122 is not performed. Note that each of the switches is pre-set with content that is categorized as not-for-display depending on the layer. The not-for-notification setting section 124 is capable of determining whether or not the content is not-for-notification by referring to values of these settings.

In a case in which a preliminary action has been detected by the functionality of the preliminary action detection section 84, the audio notification section 126 uses audio to notify the occupant of information relating to the onboard unit 39 corresponding to the right-hand switch 20R or the left-hand switch 20L that is expected to be pressed. Specifically, the audio notification section 126 outputs audio using the speaker 122 to notify the occupant of information relating to the corresponding onboard unit 39.

Example of Audio Notification Processing

Next, explanation follows regarding an example of a flow of audio notification processing by the vehicle input device 120, with reference to the flowchart in FIG. 12. The audio notification processing is for example executed when the ignition switch (power) of the vehicle 12 is switched on, and is performed by the CPU 26 reading a program from the ROM 28 or the storage 32, and expanding and executing this program in the RAM 30.

As illustrated in FIG. 12, at step S202 the CPU 26 determines whether or not touching of at least one switch out of the right-hand switches 20R or the left-hand switches 20L by the occupant has been detected. Specifically, touching of a right-hand switch 20R is determined to have been detected in a case in which a signal has been received from the first right static sensor 41, the second right static sensor 43, the third right static sensor 45, or the fourth right static sensor 47 using the functionality of the preliminary action detection section 84. Similarly, touching of a left-hand switch 20L is determined to have been detected in a case in which a signal has been received from the first left static sensor 49, the second left static sensor 51, the third left static sensor 53, or the fourth left static sensor 55.

Processing transitions to step S204 in a case in which the CPU 26 determines that touching of at least one switch out of the right-hand switches 20R or the left-hand switches 20L has been detected at step S202. The CPU 26 ends the audio notification processing in a case in which touching of the right-hand switches 20R and the left-hand switches 20L has not been detected at step S202.

At step S204, the CPU 26 determines whether or not content corresponding to the switch that has been detected as touched is categorized as not-for-notification. Specifically, the CPU 26 determines that the content is categorized as not-for-notification in a case in which determination has been made based on the functionality of the operation validity determination section 86 that input cannot be accepted. The audio notification processing is ended in a case in which the CPU 26 determines that the content is categorized as not-for-notification at step S204.

Processing transitions to step S206 in a case in which the CPU 26 determines at step S204 that the corresponding content is not categorized as not-for-notification, namely cases in which the CPU 26 determines that the content is subject to notification. At step S206, the CPU 26 uses audio to notify the occupant of the content corresponding to the switch being touched by the occupant using the functionality of the audio notification section 126. The CPU 26 then ends the audio notification processing.

Operation

Next, explanation follows regarding operation of the present exemplary embodiment.

In the vehicle input device 120 according to the present exemplary embodiment, the occupant is notified by audio of the content corresponding to the switch being touched by the occupant, thereby enabling the occupant to ascertain the content corresponding to the switch without needing to visually check the display screen 17. Other operation is similar to that in the first exemplary embodiment.

Although exemplary embodiments have been described above, obviously various implementations may be adopted within a range not departing from the spirit of the present disclosure.

In the above exemplary embodiments, the preliminary action detection section 84 detects when the occupant touches any given switch out of the right-hand switches 20R or the left-hand switches 20L. When the occupant presses any given switch out of the right-hand switches 20R or the left-hand switches 20L, the operation detection section 82 detects input to the onboard unit 39 corresponding to this switch. However, there is no limitation to the above configuration. For example, the operation detection section 82 may detect input to the onboard unit 39 corresponding to the switch when the occupant touches any given switch out of the right-hand switches 20R or the left-hand switches 20L. In such cases, the preliminary action detection section 84 detects a preliminary action directly prior to the occupant touching any given switch out of the right-hand switches 20R or the left-hand switches 20L. For example, a camera that images the hands of the occupant or sensors may be used to detect a state directly prior to the finger of the occupant touching the right-hand switches 20R or the left-hand switches 20L.

Although the right-hand switches 20R and the left-hand switches 20L are all configured by contact detection switches in the above exemplary embodiments, there is no limitation thereto. For example, the right-hand switches 20R and the left-hand switches 20L may each be configured by a switch including a pressure sensor employing a diaphragm gauge.

Although the processing performed by the CPU 26 in the each of the above exemplary embodiments is software processing performed by executing a program, there is no limitation thereto. For example, the processing may be performed using hardware. Alternatively, the processing may be performed by a combination of both software and hardware. In a case in which the processing is performed using software, a program may be stored and distributed in the form of various non-transitory storage media, such as a digital versatile disc (DVD), and executed by a processor such as the CPU 26.

What is claimed is:

1. A vehicle input device comprising:
a memory; and
a processor, the processor being configured to:
    detect an operation to an operation section of a plurality of operation sections reachable by an occupant of a driving seat,
    instruct a display to display an image including a frame corresponding to the operation section and an icon in the frame in response to detecting the operation, the image having a different function allocated for every image layer within the operation section, wherein the frame is one of a plurality of frames, the frame is comprised of a plurality of portions and each of the plurality of portions is separated from adjacent portions of the plurality of portions by interposing gaps, and at most a single icon is displayed in each of the plurality of portions for every image layer,
    instruct the display not to display the icon depending on the image layer, while displaying the frame, in response to failing to satisfy a predetermined requirement despite detection of the operation depending on the image layer.

2. The vehicle input device of claim 1, wherein the processor is configured to light up the frame representing the operation section in response to detection of the operation of the operation section.

3. The vehicle input device of claim 1, wherein each of the plurality of operation regions is allocated to each of a plurality of corresponding onboard units.

4. The vehicle input device of claim 3, wherein the icon includes an image indicating a function of the onboard unit, and wherein the processor is configured to instruct the display to display a plurality of the icons so as to correspond to an arrangement of the plurality of the icons to an arrangement of the plurality of operation regions.

5. The vehicle input device of claim 3, wherein the processor is configured to instruct the display to display the frame, in response to detecting an operation of at least one operation region of the plurality of operation regions.

6. The vehicle input device of claim 1, wherein the processor is configured to switch from a first image layer of the operation section to a second image layer of the operation section in response to detection of the operation of a predetermined operation section of the plurality of operation sections.

7. The vehicle input device of claim 4, wherein the processor is configured to instruct the display to display not to display at least one icon of the plurality of the icons while displaying the frame, in response to failing to satisfy the predetermined requirement despite detecting the operation to at least one operation region of the plurality of the operation regions.

8. A vehicle comprising:
a driving seat;
a plurality of operation sections reachable by an occupant of the diving seat;
a display viewable by the occupant;
a memory; and
a processor, wherein the processor is configured to:
 detect an operation to a first operation section of the plurality of operation sections,
 instruct the display to display an image including a frame corresponding to the operation section and an icon in the frame in response to detecting the operation, the image having a different function allocated for every image layer within the operation section, wherein the frame is one of a plurality of frames, the frame is comprised of a plurality of portions and each of the plurality of portions is separated from adjacent portions of the plurality of portions by interposing gaps, and at most a single icon is displayed in each of the plurality of portions for every image layer,
 instruct the display not to display the icon depending on the image layer, while displaying the frame, in response to failing to satisfy a predetermined requirement despite detection of the operation depending on the image layer.

9. The vehicle of claim 8, wherein the processor is configured to light up the frame representing the first operation section in response to detection of the operation of the first operation section.

10. The vehicle of claim 8, wherein each of the plurality of operation regions is allocated to each of a plurality of corresponding onboard units.

11. The vehicle of claim 10, wherein the icon includes an image indicating a function of the onboard unit, and wherein the processor is configured to instruct the display to display a plurality of the icons so as to correspond to an arrangement of the plurality of the icons to an arrangement of the plurality of operation regions.

12. The vehicle of claim 10, wherein the processor is configured to instruct the display to display the frame, in response to detecting an operation of at least one operation region of the plurality of operation regions.

13. The vehicle of claim 8, wherein the processor is configured to switch from a first image layer of the first operation section to a second image layer of the first operation section in response to detection of the operation of a predetermined operation section of the plurality of operation sections.

14. The vehicle of claim 11, wherein the processor is configured to instruct the display to display not to display at least one icon of the plurality of the icons while displaying the frame, in response to failing to satisfy the predetermined requirement despite detecting the operation to at least one operation region of the plurality of the operation regions.

15. The vehicle of claim 8, further comprising a speaker, wherein the processor is further configured to:
 determine whether the detected operation is categorized as not-for-notifications; and
 instructing the speaker to output an audio signal in response to a determination that the detected operation fails to be categorized as not-for-notification.

16. The vehicle of claim 8, further comprising a steering wheel, wherein the display is attached to the steering wheel.

17. The vehicle of claim 8, wherein the display includes a heads-up display (HUD).

18. A vehicle input device comprising:
a memory; and
a processor, the processor being configured to:
 detect an operation to an operation section of a plurality of operation sections,
 instruct a display to display an image in response to detecting the operation, the image having a different function allocated for every image layer within the operation section, wherein the image includes:
  a frame corresponding to the operation section, wherein the frame is one of a plurality of frames, the frame is comprised of a plurality of portions and each of the plurality of portions is separated from adjacent portions of the plurality of portions by interposing gaps, and at most a single icon is displayed in each of the plurality of portions for every image layer, and
  in response to the detected operation satisfying a predetermined requirement, the image further includes an icon in the frame, and
 instruct the display not to display the icon depending on the image layer, while displaying the frame, in response to failing to satisfy the predetermined requirement despite detection of the operation depending on the image layer.

19. The vehicle input device of claim 18, wherein the predetermined requirement includes whether a functionality associated with the icon is executable by a vehicle including the vehicle input device.

20. The vehicle input device of claim 18, wherein the processor is further configured to switch from a first image layer of the operation section to a second image layer of the operation section in response to detection of the operation of a predetermined operation section of the plurality of operation sections.

* * * * *